United States Patent
Yang et al.

(10) Patent No.: US 10,952,036 B2
(45) Date of Patent: *Mar. 16, 2021

(54) METHOD FOR REGROUPING MULTIPLE GROUPS AND DEVICE

(71) Applicant: Huawei Technologies Co., Ltd., Shenzhen (CN)

(72) Inventors: Yanmei Yang, Beijing (CN); Yizhuang Wu, Beijing (CN); Cuili Ge, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/592,569

(22) Filed: Oct. 3, 2019

(65) Prior Publication Data

US 2020/0037119 A1 Jan. 30, 2020

Related U.S. Application Data

(63) Continuation of application No. 15/722,858, filed on Oct. 2, 2017, now Pat. No. 10,470,003, which is a
(Continued)

(51) Int. Cl.
*H04W 4/08* (2009.01)
*H04W 4/10* (2009.01)
*H04W 84/08* (2009.01)

(52) U.S. Cl.
CPC ............... *H04W 4/08* (2013.01); *H04W 4/10* (2013.01); *H04W 84/08* (2013.01)

(58) Field of Classification Search
CPC .................................. H04W 4/08; H04W 4/10
(Continued)

(56) References Cited

U.S. PATENT DOCUMENTS

| 5,117,501 A | 5/1992 | Childress et al. |
| 6,882,856 B1 * | 4/2005 | Alterman ................ H04W 4/08 |
| | | 370/312 |

(Continued)

FOREIGN PATENT DOCUMENTS

| CN | 1889722 A | 1/2007 |
| CN | 101009872 A | 8/2007 |

(Continued)

OTHER PUBLICATIONS

Hengeveld et al., "TIA-4973.201 Requirements for Mission Critical PTT and Related Supplementary Services Rev R15," TIA Committee TR-8 Broadband Data (TR-8.8), XP050743544A, 3rd Generation Partnership Project (Dec. 17, 2013).
(Continued)

*Primary Examiner* — John J Lee
(74) *Attorney, Agent, or Firm* — Leydig, Voit & Mayer, Ltd.

(57) ABSTRACT

A method for regrouping multiple groups and a device are provided. The method includes: receiving, by a first group management functional entity, a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped; and the first MCPTT user belongs to at least one MCPTT group of the N MCPTT groups; and configuring information about the temporary group, where the information about the temporary group includes an identifier of the temporary group into which the N MCPTT groups are regrouped, and the identifiers of the N MCPTT groups.

20 Claims, 5 Drawing Sheets

---

S701. A second group management functional entity receives a group regrouping creation message that is sent by first UE and that is forwarded by a first group management functional entity, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped — S701

S702. The second group management functional entity sends a group regrouping response message to the first group management functional entity — S702

Related U.S. Application Data continuation of application No. PCT/CN2015/075903, filed on Apr. 3, 2015.

(58) Field of Classification Search
USPC ............ 455/517, 518, 519, 520, 509, 452.1, 455/67.11
See application file for complete search history.

(56) References Cited

U.S. PATENT DOCUMENTS

| | | | |
|---|---|---|---|
| 7,933,621 B1* | 4/2011 | Vu | H04W 4/08 455/518 |
| 8,234,335 B1 | 7/2012 | Haldar et al. | |
| 2005/0186970 A1 | 8/2005 | Yates et al. | |
| 2006/0009249 A1 | 1/2006 | Fu et al. | |
| 2010/0311459 A1* | 12/2010 | Holland | H04W 8/186 455/518 |
| 2016/0302048 A1* | 10/2016 | Suzuki | H04W 4/10 |

FOREIGN PATENT DOCUMENTS

| | | |
|---|---|---|
| CN | 101707742 A | 5/2010 |
| CN | 103167421 A | 6/2013 |
| WO | 2015038438 A1 | 3/2015 |

OTHER PUBLICATIONS

"3rd Generation Partnership Project; Technical Specification Group Services and System Aspects; Mission Critical Push to Talk (MCPTT) over LTE; Stage 1 (Release 13)," 3GPP TS 22.179 v.13.1.0, XP050927972, pp. 1-76, 3rd Generation Partnership Project, Valbonne, France, (Mar. 2015).

"Group Regrouping Clarification," 3GPP TSG-SA WG1 Meeting #67bis and #68, San Francisco, USA, S1-144593, 3rd Generation Partnership Project, Valbonne, France (Nov. 13-14 and 17-21, 2014).

CN/201580042598.3, Notice of Allowance, dated May 7, 2020.

U.S. Appl. No. 15/722,858, filed Oct. 2, 2017.

* cited by examiner

METHOD FOR REGROUPING MULTIPLE GROUPS AND DEVICE

CROSS-REFERENCE TO RELATED APPLICATIONS

This application is a continuation of U.S. application Ser. No. 15/722,858, filed on Oct. 2, 2017, which is a continuation of International Application No. PCT/CN2015/075903, filed on Apr. 3, 2015. All of the afore-mentioned patent applications are hereby incorporated by reference in their entireties.

TECHNICAL FIELD

Embodiments of the present application relate to the field of communications technologies, and in particular, to a method for regrouping multiple groups and a device.

BACKGROUND

In actual application, there is a requirement, that is, an authorized mission critical push to talk (MCPTT for short) user may temporarily group several MCPTT groups into a temporary group. For example, in some emergencies, a fire department and a public security department work together, and an on-scene commander may need to temporarily group the two MCPTT groups of the fire department and the public security department into a new large group. This MCPTT group regrouping function cannot be supported in the prior art yet.

SUMMARY

Embodiments of the present application provide a method for regrouping multiple groups and a device, to enable mutual communication between user equipment (UE for short) used by MCPTT users in multiple MCPTT groups.

According to a first aspect, an embodiment of the present application provides a method for regrouping multiple groups, including:

receiving, by a first group management functional entity, a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped; the first group management functional entity is a group management functional entity in a home network of the first MCPTT user; and the first MCPTT user belongs to at least one MCPTT group of the N MCPTT groups; and configuring, by the first group management functional entity, information about the temporary group, where the information about the temporary group includes: an identifier of the temporary group into which the N MCPTT groups are regrouped, and the identifiers of the N MCPTT groups.

In a first possible implementation of the first aspect, after the configuring, by the first group management functional entity, information about the temporary group, the method further includes:

sending, by the first group management functional entity, a group regrouping complete message to the first UE.

With reference to the first aspect or the first possible implementation of the first aspect, in a second possible implementation of the first aspect, the information about the temporary group further includes at least one of the following: information about an MCPTT user in at least one MCPTT group of the N MCPTT groups, a priority of the temporary group, or a security level of the temporary group.

With reference to the first aspect or the first possible implementation of the first aspect or the second possible implementation of the first aspect, in a third possible implementation of the first aspect, the N MCPTT groups are MCPTT groups managed by the first group management functional entity.

With reference to the first aspect or the first possible implementation of the first aspect or the second possible implementation of the first aspect, in a fourth possible implementation of the first aspect, a first MCPTT group of the N MCPTT groups is not an MCPTT group managed by the first group management functional entity, and the first MCPTT group is at least one MCPTT group of the N MCPTT groups;

before the configuring, by the first group management functional entity, information about the temporary group, the method further includes:

sending, by the first group management functional entity, the group regrouping creation message to a second group management functional entity, where the second group management functional entity is any group management functional entity that manages at least one MCPTT group of the first MCPTT group; and receiving, by the first group management functional entity, a group regrouping response message sent by the second group management functional entity; and the configuring, by the first group management functional entity, information about the temporary group includes: configuring, by the first group management functional entity, the information about the temporary group according to the group regrouping response message.

With reference to the fourth possible implementation of the first aspect, in a fifth possible implementation of the first aspect, the group regrouping response message further includes information about an MCPTT user in the at least one MCPTT group that is of the first MCPTT group and that is managed by the second group management functional entity.

With reference to the first aspect or any one of the first to the fifth possible implementations of the first aspect, in a sixth possible implementation of the first aspect, after the configuring, by the first group management functional entity, information about the temporary group, the method further includes:

sending, by the first group management functional entity, group regrouping information to second UE, where the group regrouping information includes the identifier of the temporary group, the second UE is UE used by a second MCPTT user, and the second MCPTT user is any MCPTT user in the N MCPTT groups.

With reference to the sixth possible implementation of the first aspect, in a seventh possible implementation of the first aspect, when an MCPTT group to which the second MCPTT user belongs is not an MCPTT group managed by the first group management functional entity, the sending, by the first group management functional entity, group regrouping information to second UE includes:

sending, by the first group management functional entity, the group regrouping information to a group management functional entity of the MCPTT group to which the second MCPTT user belongs, so that the group management functional entity of the MCPTT group to which the second MCPTT user belongs sends the group regrouping information to the second UE.

With reference to the sixth possible implementation of the first aspect or the seventh possible implementation of the first aspect, in an eighth possible implementation of the first aspect, the method further includes:

receiving, by the first group management functional entity, a group regrouping release message sent by the first UE, where the group regrouping release message includes the identifier of the temporary group, and the group regrouping release message is used to request the first group management functional entity to release the temporary group according to the identifier of the temporary group; and sending, by the first group management functional entity, group regrouping release notification information to the second UE according to the group regrouping release message, where the group regrouping release notification information includes the identifier of the temporary group; and the group regrouping release notification information is used to instruct the second UE to delete the group regrouping information according to the identifier of the temporary group.

With reference to the eighth possible implementation of the first aspect, in a ninth possible implementation of the first aspect, when an MCPTT group to which the second MCPTT user belongs is not an MCPTT group managed by the first group management functional entity, the sending, by the first group management functional entity, group regrouping release notification information to the second UE according to the group regrouping release message includes:

sending, by the first group management functional entity according to the group regrouping release message, the group regrouping release notification information to a group management functional entity of the MCPTT group to which the second MCPTT user belongs, so that the group management functional entity of the MCPTT group to which the second MCPTT user belongs sends the group regrouping release notification information to the second UE.

With reference to the eighth possible implementation of the first aspect or the ninth possible implementation of the first aspect, in a tenth possible implementation of the first aspect, after the receiving, by the first group management functional entity, a group regrouping release message sent by the first UE, the method further includes:

deleting, by the first group management functional entity, the information about the temporary group.

According to a second aspect, an embodiment of the present application provides a method for regrouping multiple groups, including:

generating, by first UE, a group regrouping creation message, where the group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped, where N is an integer greater than or equal to 2; the first MCPTT user belongs to at least one MCPTT group of the N MCPTT groups; and the first group management functional entity is a group function management entity in a home network of the first MCPTT user; and sending, by the first UE, the group regrouping creation message to the first group management functional entity.

In a first possible implementation of the second aspect, after the sending, by the first UE, the group regrouping creation message to the first group management functional entity, the method further includes:

receiving, by the first UE, a group regrouping complete message sent by the first group management functional entity.

With reference to the second aspect or the first possible implementation of the second aspect, in a second possible implementation of the second aspect, after the sending, by the first UE, the group regrouping creation message to the first group management functional entity, the method further includes:

receiving, by the first UE, group regrouping information sent by the first group management functional entity, where the group regrouping information includes an identifier of the temporary group.

With reference to the second aspect or the first possible implementation of the second aspect or the second possible implementation of the second aspect, in a third possible implementation of the second aspect, after the sending, by the first UE, the group regrouping creation message to the first group management functional entity, the method further includes:

sending, by the first UE, a group regrouping release message to the first group management functional entity, where the group regrouping release message includes the identifier of the temporary group, and the group regrouping release message is used to request the first group management functional entity to release the temporary group according to the identifier of the temporary group;

receiving, by the first UE, group regrouping release notification information sent by the first group management functional entity, where the group regrouping release notification information includes the identifier of the temporary group; and deleting, by the first UE, the group regrouping information according to the identifier of the temporary group in the group regrouping release notification information.

According to a third aspect, an embodiment of the present application provides a method for regrouping multiple groups, including:

receiving, by a second group management functional entity, a group regrouping creation message that is sent by first UE and that is forwarded by a first group management functional entity, where the group regrouping creation message includes identifiers of N MCPTT groups, the group regrouping creation message is used to request the first group management functional entity to create, according to the identifiers of the N MCPTT groups, a temporary group which is initiated by a first MCPTT user and into which the N MCPTT groups are regrouped, and the second group management functional entity manages at least one MCPTT group of the N MCPTT groups; the first group management functional entity is a group management functional entity in a home network of the first MCPTT user; and the first MCPTT user belongs to at least one MCPTT group of the N MCPTT groups; and sending, by the second group management functional entity, a group regrouping response message to the first group management functional entity.

In a first possible implementation of the third aspect, the group regrouping response message further includes information about an MCPTT user in the at least one MCPTT group that is of the N MCPTT groups and that is managed by the second group management functional entity.

With reference to the third aspect or the first possible implementation of the third aspect, in a second possible implementation of the third aspect, after the sending, by the second group management functional entity, a group regrouping response message to the first group management functional entity, the method further includes:

receiving, by the second group management functional entity, group regrouping information sent by the first group management functional entity, where the group regrouping information includes an identifier of the temporary group; and sending, by the second group management functional entity, the group regrouping information to second UE, where the second UE is UE used by a second MCPTT user, and the second MCPTT user is any MCPTT user in the at least one MCPTT group that is of the N MCPTT groups and that is managed by the second group management functional entity.

With reference to the second possible implementation of the third aspect, in a third possible implementation of the third aspect, the method further includes:

receiving, by the second group management functional entity, group regrouping release notification information sent by the first group management functional entity, where the group regrouping release notification information includes the identifier of the temporary group; and the group regrouping release notification information is used to instruct to delete the group regrouping information according to the identifier of the temporary group; and sending, by the second group management functional entity, the group regrouping release notification information to the second UE.

With reference to the third possible implementation of the third aspect, in a fourth possible implementation of the third aspect, after the receiving, by the second group management functional entity, group regrouping release notification information sent by the first group management functional entity, the method further includes:

deleting, by the second group management functional entity, the group regrouping information.

According to a fourth aspect, an embodiment of the present application provides a group management functional entity, used as a first group management functional entity, including:

a transceiver unit, configured to receive a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped; the first group management functional entity is a group management functional entity in a home network of the first MCPTT user; and the first MCPTT user belongs to at least one MCPTT group of the N MCPTT groups; and a processing unit, configured to configure information about the temporary group, where the information about the temporary group includes: an identifier of the temporary group into which the N MCPTT groups are regrouped, and the identifiers of the N MCPTT groups.

In a first possible implementation of the fourth aspect, the transceiver unit is further configured to: after the processing unit configures the information about the temporary group, send a group regrouping complete message to the first UE.

With reference to the fourth aspect or the first possible implementation of the fourth aspect, in a second possible implementation of the fourth aspect, the information about the temporary group further includes at least one of the following: information about an MCPTT user in at least one MCPTT group of the N MCPTT groups, a priority of the temporary group, or a security level of the temporary group.

With reference to the fourth aspect or the first possible implementation of the fourth aspect or the second possible implementation of the fourth aspect, in a third possible implementation of the fourth aspect, the N MCPTT groups are MCPTT groups managed by the first group management functional entity.

With reference to the fourth aspect or the first possible implementation of the fourth aspect or the second possible implementation of the fourth aspect, in a fourth possible implementation of the fourth aspect, a first MCPTT group of the N MCPTT groups is not an MCPTT group managed by the first group management functional entity, and the first MCPTT group is at least one MCPTT group of the N MCPTT groups;

the transceiver unit is further configured to: before the processing unit configures the information about the temporary group, send the group regrouping creation message to a second group management functional entity, where the second group management functional entity is any group management functional entity that manages at least one MCPTT group of the first MCPTT group; and receive a group regrouping response message sent by the second group management functional entity; and when configuring the information about the temporary group, the processing unit is specifically configured to configure the information about the temporary group according to the group regrouping response message.

With reference to the fourth possible implementation of the fourth aspect, in a fifth possible implementation of the fourth aspect, the group regrouping response message further includes information about an MCPTT user in the at least one MCPTT group that is of the first MCPTT group and that is managed by the second group management functional entity.

With reference to the fourth aspect or any one of the first to the fifth possible implementations of the fourth aspect, in a sixth possible implementation of the fourth aspect, the transceiver unit is further configured to: after the processing unit configures the information about the temporary group, send group regrouping information to second UE, where the group regrouping information includes the identifier of the temporary group, the second UE is UE used by a second MCPTT user, and the second MCPTT user is any MCPTT user in the N MCPTT groups.

With reference to the sixth possible implementation of the fourth aspect, in a seventh possible implementation of the fourth aspect, when an MCPTT group to which the second MCPTT user belongs is not an MCPTT group managed by the first group management functional entity, when sending the group regrouping information to the second UE, the transceiver unit is specifically configured to send the group regrouping information to a group management functional entity of the MCPTT group to which the second MCPTT user belongs, so that the group management functional entity of the MCPTT group to which the second MCPTT user belongs sends the group regrouping information to the second UE.

With reference to the sixth possible implementation of the fourth aspect or the seventh possible implementation of the fourth aspect, in an eighth possible implementation of the fourth aspect, the transceiver unit is further configured to: receive a group regrouping release message sent by the first UE, where the group regrouping release message includes the identifier of the temporary group, and the group regrouping release message is used to request the first group management functional entity to release the temporary group according to the identifier of the temporary group; and send group regrouping release notification information to the second UE according to the group regrouping release message, where the group regrouping release notification information includes the identifier of the temporary group; and the group regrouping release notification information is used to instruct the second UE to delete the group regrouping information according to the identifier of the temporary group.

With reference to the eighth possible implementation of the fourth aspect, in a ninth possible implementation of the fourth aspect, when an MCPTT group to which the second MCPTT user belongs is not an MCPTT group managed by the first group management functional entity, when sending the group regrouping release notification information to the second UE according to the group regrouping release message, the transceiver unit is specifically configured to send, according to the group regrouping release message, the group regrouping release notification information to a group management functional entity of the MCPTT group to which the second MCPTT user belongs, so that the group management functional entity of the MCPTT group to which the second MCPTT user belongs sends the group regrouping release notification information to the second UE.

With reference to the eighth possible implementation of the fourth aspect or the ninth possible implementation of the fourth aspect, in a tenth possible implementation of the fourth aspect, the processing unit is further configured to: after the transceiver unit receives the group regrouping release message sent by the first UE, delete the information about the temporary group.

According to a fifth aspect, an embodiment of the present application provides UE, used as first UE, including:

a processing unit, configured to generate a group regrouping creation message, where the group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped, where N is an integer greater than or equal to 2; the first MCPTT user belongs to at least one MCPTT group of the N MCPTT groups; and the first group management functional entity is a group function management entity in a home network of the first MCPTT user; and a transceiver unit, configured to send the group regrouping creation message to the first group management functional entity.

In a first possible implementation of the fifth aspect, the transceiver unit is further configured to: after sending the group regrouping creation message to the first group management functional entity, receive a group regrouping complete message sent by the first group management functional entity.

With reference to the fifth aspect or the first possible implementation of the fifth aspect, in a second possible implementation of the fifth aspect, the transceiver unit is further configured to: after sending the group regrouping creation message to the first group management functional entity, receive group regrouping information sent by the first group management functional entity, where the group regrouping information includes an identifier of the temporary group.

With reference to the fifth aspect or the first possible implementation of the fifth aspect or the second possible implementation of the fifth aspect, in a third possible implementation of the fifth aspect, the transceiver unit is further configured to: after sending the group regrouping creation message to the first group management functional entity, send a group regrouping release message to the first group management functional entity, where the group regrouping release message includes the identifier of the temporary group, and the group regrouping release message is used to request the first group management functional entity to release the temporary group according to the identifier of the temporary group; and receive group regrouping release notification information sent by the first group management functional entity, where the group regrouping release notification information includes the identifier of the temporary group; and the processing unit is further configured to delete the group regrouping information according to the identifier of the temporary group in the group regrouping release notification information.

According to a sixth aspect, an embodiment of the present application provides a group management functional entity, used as a second group management functional entity, including:

a receiving unit, configured to receive a group regrouping creation message that is sent by first UE and that is forwarded by a first group management functional entity, where the group regrouping creation message includes identifiers of N MCPTT groups, the group regrouping creation message is used to request the first group management functional entity to create, according to the identifiers of the N MCPTT groups, a temporary group which is initiated by a first MCPTT user and into which the N MCPTT groups are regrouped, and the second group management functional entity manages at least one MCPTT group of the N MCPTT groups; the first group management functional entity is a group management functional entity in a home network of the first MCPTT user; and the first MCPTT user belongs to at least one MCPTT group of the N MCPTT groups; and a sending unit, configured to send a group regrouping response message to the first group management functional entity.

In a first possible implementation of the sixth aspect, the group regrouping response message further includes information about an MCPTT user in the at least one MCPTT group that is of the N MCPTT groups and that is managed by the second group management functional entity.

With reference to the sixth aspect or the first possible implementation of the sixth aspect, in a second possible implementation of the sixth aspect, the receiving unit is further configured to: after the sending unit sends the group regrouping response message to the first group management functional entity, receive group regrouping information sent by the first group management functional entity, where the group regrouping information includes an identifier of the temporary group; and the sending unit is further configured to send the group regrouping information to second UE, where the second UE is UE used by a second MCPTT user, and the second MCPTT user is any MCPTT user in the at least one MCPTT group that is of the N MCPTT groups and that is managed by the second group management functional entity.

With reference to the second possible implementation of the sixth aspect, in a third possible implementation of the sixth aspect, the receiving unit is further configured to receive group regrouping release notification information sent by the first group management functional entity, where the group regrouping release notification information includes the identifier of the temporary group; and the group regrouping release notification information is used to instruct to delete the group regrouping information according to the identifier of the temporary group; and the sending unit is further configured to send the group regrouping release notification information to the second UE.

With reference to the third possible implementation of the sixth aspect, in a fourth possible implementation of the sixth aspect, the group management functional entity further includes:

a processing unit, configured to: after the receiving unit receives the group regrouping release notification information sent by the first group management functional entity, delete the group regrouping information.

According to a seventh aspect, an embodiment of the present application provides a group management functional entity, used as a first group management functional entity, including:

a transceiver, configured to receive a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped; the first group management functional entity is a group management functional entity in a home network of the first MCPTT user; and the first MCPTT user belongs to at least one MCPTT group of the N MCPTT groups; and a processor, configured to configure information about the temporary group, where the information about the temporary group includes: an identifier of the temporary group into which the N MCPTT groups are regrouped, and the identifiers of the N MCPTT groups.

In a first possible implementation of the seventh aspect, the transceiver is further configured to: after the processor configures the information about the temporary group, send a group regrouping complete message to the first UE.

With reference to the seventh aspect or the first possible implementation of the seventh aspect, in a second possible implementation of the seventh aspect, the information about the temporary group further includes at least one of the following: information about an MCPTT user in at least one MCPTT group of the N MCPTT groups, a priority of the temporary group, or a security level of the temporary group.

With reference to the seventh aspect or the first possible implementation of the seventh aspect or the second possible implementation of the seventh aspect, in a third possible implementation of the seventh aspect, the N MCPTT groups are MCPTT groups managed by the first group management functional entity.

With reference to the seventh aspect or the first possible implementation of the seventh aspect or the second possible implementation of the seventh aspect, in a fourth possible implementation of the seventh aspect, a first MCPTT group of the N MCPTT groups is not an MCPTT group managed by the first group management functional entity, and the first MCPTT group is at least one MCPTT group of the N MCPTT groups;

the transceiver is further configured to: before the processor configures the information about the temporary group, send the group regrouping creation message to a second group management functional entity, where the second group management functional entity is any group management functional entity that manages at least one MCPTT group of the first MCPTT group; and receive a group regrouping response message sent by the second group management functional entity; and when configuring the information about the temporary group, the processor is specifically configured to configure the information about the temporary group according to the group regrouping response message.

With reference to the fourth possible implementation of the seventh aspect, in a fifth possible implementation of the seventh aspect, the group regrouping response message further includes information about an MCPTT user in the at least one MCPTT group that is of the first MCPTT group and that is managed by the second group management functional entity.

With reference to the seventh aspect or any one of the first to the fifth possible implementations of the seventh aspect, in a sixth possible implementation of the seventh aspect, the transceiver is further configured to: after the processor configures the information about the temporary group, send group regrouping information to second UE, where the group regrouping information includes the identifier of the temporary group, the second UE is UE used by a second MCPTT user, and the second MCPTT user is any MCPTT user in the N MCPTT groups.

With reference to the sixth possible implementation of the seventh aspect, in a seventh possible implementation of the seventh aspect, when an MCPTT group to which the second MCPTT user belongs is not an MCPTT group managed by the first group management functional entity, when sending the group regrouping information to the second UE, the transceiver is specifically configured to send the group regrouping information to a group management functional entity of the MCPTT group to which the second MCPTT user belongs, so that the group management functional entity of the MCPTT group to which the second MCPTT user belongs sends the group regrouping information to the second UE.

With reference to the sixth possible implementation of the seventh aspect or the seventh possible implementation of the seventh aspect, in an eighth possible implementation of the seventh aspect, the transceiver is further configured to: receive a group regrouping release message sent by the first UE, where the group regrouping release message includes the identifier of the temporary group, and the group regrouping release message is used to request the first group management functional entity to release the temporary group according to the identifier of the temporary group; and send group regrouping release notification information to the second UE according to the group regrouping release message, where the group regrouping release notification information includes the identifier of the temporary group; and the group regrouping release notification information is used to instruct the second UE to delete the group regrouping information according to the identifier of the temporary group.

With reference to the eighth possible implementation of the seventh aspect, in a ninth possible implementation of the seventh aspect, when an MCPTT group to which the second MCPTT user belongs is not an MCPTT group managed by the first group management functional entity, when sending the group regrouping release notification information to the second UE according to the group regrouping release message, the transceiver is specifically configured to send, according to the group regrouping release message, the group regrouping release notification information to a group management functional entity of the MCPTT group to which the second MCPTT user belongs, so that the group management functional entity of the MCPTT group to which the second MCPTT user belongs sends the group regrouping release notification information to the second UE.

With reference to the eighth possible implementation of the seventh aspect or the ninth possible implementation of the seventh aspect, in a tenth possible implementation of the seventh aspect, the processor is further configured to: after the transceiver receives the group regrouping release message sent by the first UE, delete the information about the temporary group.

According to an eighth aspect, an embodiment of the present application provides UE, used as first UE, including:

a processor, configured to generate a group regrouping creation message, where the group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped, where N is an integer greater than or equal to 2; the first MCPTT user belongs to at least one MCPTT group of the N MCPTT groups; and the first group management functional entity is a group function management entity in a home network of the first MCPTT user; and a transceiver, configured to send the group regrouping creation message to the first group management functional entity.

In a first possible implementation of the eighth aspect, the transceiver is further configured to: after sending the group regrouping creation message to the first group management functional entity, receive a group regrouping complete message sent by the first group management functional entity.

With reference to the eighth aspect or the first possible implementation of the eighth aspect, in a second possible implementation of the eighth aspect, the transceiver is further configured to: after sending the group regrouping creation message to the first group management functional entity, receive group regrouping information sent by the first group management functional entity, where the group regrouping information includes an identifier of the temporary group.

With reference to the eighth aspect or the first possible implementation of the eighth aspect or the second possible implementation of the eighth aspect, in a third possible implementation of the eighth aspect, the transceiver is further configured to: after sending the group regrouping creation message to the first group management functional entity, send a group regrouping release message to the first group management functional entity, where the group regrouping release message includes the identifier of the temporary group, and the group regrouping release message is used to request the first group management functional entity to release the temporary group according to the identifier of the temporary group; and receive group regrouping release notification information sent by the first group management functional entity, where the group regrouping release notification information includes the identifier of the temporary group; and the processor is further configured to delete the group regrouping information according to the identifier of the temporary group in the group regrouping release notification information.

According to a ninth aspect, an embodiment of the present application provides a group management functional entity, used as a second group management functional entity, including:

a receiver, configured to receive a group regrouping creation message that is sent by first UE and that is forwarded by a first group management functional entity, where the group regrouping creation message includes identifiers of N MCPTT groups, the group regrouping creation message is used to request the first group management functional entity to create, according to the identifiers of the N MCPTT groups, a temporary group which is initiated by a first MCPTT user and into which the N MCPTT groups are regrouped, and the second group management functional entity manages at least one MCPTT group of the N MCPTT groups; the first group management functional entity is a group management functional entity in a home network of the first MCPTT user; and the first MCPTT user belongs to at least one MCPTT group of the N MCPTT groups; and a transmitter, configured to send a group regrouping response message to the first group management functional entity.

In a first possible implementation of the ninth aspect, the group regrouping response message further includes information about an MCPTT user in the at least one MCPTT group that is of the N MCPTT groups and that is managed by the second group management functional entity.

With reference to the ninth aspect or the first possible implementation of the ninth aspect, in a second possible implementation of the ninth aspect, the receiver is further configured to: after the transmitter sends the group regrouping response message to the first group management functional entity, receive group regrouping information sent by the first group management functional entity, where the group regrouping information includes an identifier of the temporary group; and the transmitter is further configured to send the group regrouping information to second UE, where the second UE is UE used by a second MCPTT user, and the second MCPTT user is any MCPTT user in the at least one MCPTT group that is of the N MCPTT groups and that is managed by the second group management functional entity.

With reference to the second possible implementation of the ninth aspect, in a third possible implementation of the ninth aspect, the receiver is further configured to receive group regrouping release notification information sent by the first group management functional entity, where the group regrouping release notification information includes the identifier of the temporary group; and the group regrouping release notification information is used to instruct to delete the group regrouping information according to the identifier of the temporary group; and the transmitter is further configured to send the group regrouping release notification information to the second UE.

With reference to the third possible implementation of the ninth aspect, in a fourth possible implementation of the ninth aspect, the group management functional entity further includes:

a processor, configured to: after the receiver receives the group regrouping release notification information sent by the first group management functional entity, delete the group regrouping information.

According to the method for regrouping multiple groups and the device that are provided in the embodiments of the present application, a first group management functional entity receives a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped; and then configures information about the temporary group, where the information about the temporary group includes an identifier of the temporary group into which the N MCPTT groups are regrouped, and the identifiers of the N MCPTT groups, so as to regroup the N MCPTT groups. Therefore, an MCPTT user in the N MCPTT groups belongs to the temporary group into which the N MCPTT groups are regrouped, so that UEs used by MCPTT users that belong to the same temporary group into which the N MCPTT groups are regrouped can communicate with each other.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1:
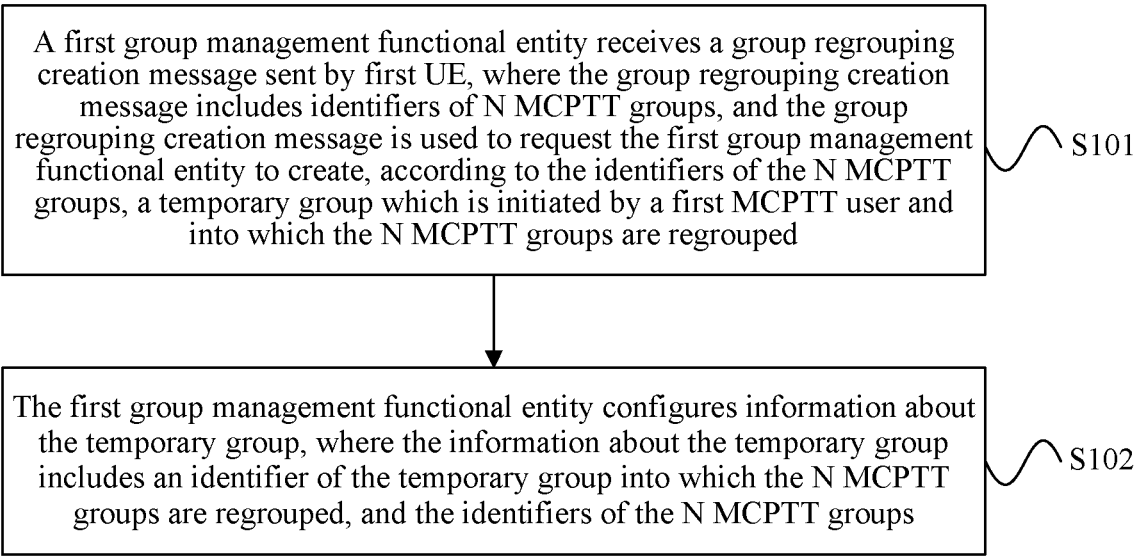
FIG. 1 is a flowchart of Embodiment 1 of a method for regrouping multiple groups according to the present application.

FIG. 1 is a flowchart of Embodiment 1 of a method for regrouping multiple groups according to the present application. As shown in FIG. 1, the method in this embodiment may include the following steps.

S101: A first group management functional entity receives a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped.

In this embodiment, the first group management functional entity is a group management functional entity in a home network of the first MCPTT user. The first group management functional entity receives the group regrouping creation message sent by the first UE. The group regrouping creation message includes the identifiers of the N MCPTT groups, and the group regrouping creation message is used to request the first group management functional entity to create, according to the identifiers of the N MCPTT groups, the temporary group which is initiated by the first MCPTT user and into which the N MCPTT groups are regrouped. Each MCPTT group includes at least one MCPTT user. The first MCPTT user belongs to at least one MCPTT group of the N MCPTT groups, that is, the first MCPTT user may belong to multiple MCPTT groups of the N MCPTT groups at the same time.

S102: The first group management functional entity configures information about the temporary group, where the information about the temporary group includes: an identifier of the temporary group into which the N MCPTT groups are regrouped, and the identifiers of the N MCPTT groups.

In this embodiment, after receiving the group regrouping creation message sent by the first UE, the first group management functional entity may regroup the N MCPTT groups into a group, where the group obtained after the regrouping is referred to as a temporary group. The first group management functional entity may further configure the identifier of the temporary group, and then the information about the temporary group may be generated. In this embodiment, the first group management functional entity completes configuring the information about the temporary group, indicating that the temporary group into which the N MCPTTs are regrouped has been created.

According to the method for regrouping multiple groups that is provided in the embodiment, a first group management functional entity receives a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped; and then configures information about the temporary group, where the information about the temporary group includes an identifier of the temporary group into which the N MCPTT groups are regrouped, and the identifiers of the N MCPTT groups, so as to regroup the N MCPTT groups. Therefore, an MCPTT user in the N MCPTT groups belongs to the temporary group into which the N MCPTT groups are regrouped, so that UEs used by MCPTT users that belong to the same temporary group into which the N MCPTT groups are regrouped can communicate with each other.

Optionally, after configuring the information about the temporary group, the first group management functional entity may further send a group regrouping complete message to the first UE. The group regrouping complete message is used to indicate that the regrouping of the N MCPTT groups is completed. Correspondingly, the first UE receives the group regrouping complete message sent by the first group management functional entity, and learns that the regrouping of the N MCPTT groups is completed.

Optionally, the information about the temporary group, configured by the first group management functional entity, further includes at least one of the following: information about an MCPTT user in at least one MCPTT group of the N MCPTT groups, a priority of the temporary group, or a security level of the temporary group.

Figure 2:
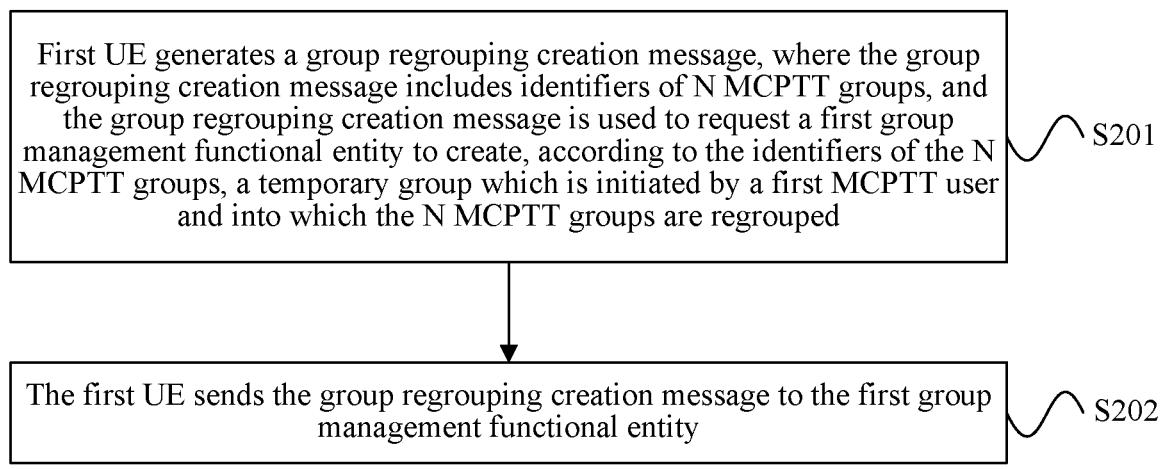
FIG. 2 is a flowchart of Embodiment 2 of a method for regrouping multiple groups according to the present application.

FIG. 2 is a flowchart of Embodiment 2 of a method for regrouping multiple groups according to the present application. As shown in FIG. 2, the method in this embodiment may include the following steps.

S201: First UE generates a group regrouping creation message, where the group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped.

In this embodiment, the first UE is UE used by the first MCPTT user. When the first MCPTT user initiates regrouping of the N MCPTT groups, the first UE may determine that the first MCPTT user initiates the regrouping of the N MCPTT groups. The first UE may generate the group regrouping creation message. The group regrouping creation message is used to request the first group management functional entity to create the temporary group which is initiated by the first MCPTT user and into which the N MCPTT groups are regrouped. The first group management functional entity is a group function management entity in a home network of the first MCPTT user. N is an integer greater than or equal to 2. Each MCPTT group includes at least one MCPTT user. The first MCPTT user may belong to at least one MCPTT group at the same time, and therefore, an MCPTT group to which the first MCPTT user belongs is at least one MCPTT group of the N MCPTT groups.

S202: The first UE sends the group regrouping creation message to the first group management functional entity.

In this embodiment, after generating the group regrouping creation message, the first UE sends the group regrouping creation message to the first group management functional entity, so that after receiving the group regrouping creation message, the first group management functional entity configures, according to the group regrouping creation message, information about the temporary group into which the N MCPTT groups are regrouped, where the information about the temporary group includes an identifier of the temporary group, and the identifiers of the N MCPTT groups, so as to regroup the N MCPTT groups.

According to the method for regrouping multiple groups that is provided in this embodiment, first UE generates a group regrouping creation message, where the group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped; and then sends the group regrouping creation message to the first group management functional entity, where the first group management functional entity is a group function management entity in a home network of the first MCPTT user, so that the first group management functional entity configures information about the temporary group, so as to regroup the N MCPTT groups. Therefore, an MCPTT user in the N MCPTT groups belongs to the temporary group into which the N MCPTT groups are regrouped, so that UEs used by MCPTT users that belong to the same temporary group into which the N MCPTT groups are regrouped can communicate with each other.

Optionally, after the first UE sends the group regrouping creation message to the first group management functional entity, the first UE receives a group regrouping complete message sent by the first group management functional entity. The group regrouping complete message is used to indicate that the regrouping of the N MCPTT groups is completed. Therefore, the first UE may learn, according to the group regrouping complete message, that the regrouping of the N MCPTT groups is completed.

Optionally, after sending the group regrouping creation message to the first group management functional entity, the first UE may further receive group regrouping information sent by the first group management functional entity. The group regrouping information includes the identifier of the temporary group into which the N MCPTT groups are regrouped.

Optionally, the information about the temporary group, configured by the first group management functional entity, further includes at least one of the following: information about an MCPTT user in at least one MCPTT group of the N MCPTT groups, a priority of the temporary group, or a security level of the temporary group. Therefore, the group regrouping information may further include at least one of the following: information about an MCPTT user in at least one MCPTT group of the N MCPTT groups, a priority of the temporary group, or a security level of the temporary group.

Optionally, information about an MCPTT user in at least one MCPTT group of the N MCPTT groups that is in the group regrouping information may include information about an MCPTT user in the at least one MCPTT group that is of the N MCPTT groups and that is managed by the first group management functional entity, or may include information about an MCPTT user in at least one MCPTT group that is of the N MCPTT groups and that is not an MCPTT group managed by the first group management functional entity.

Figure 3:
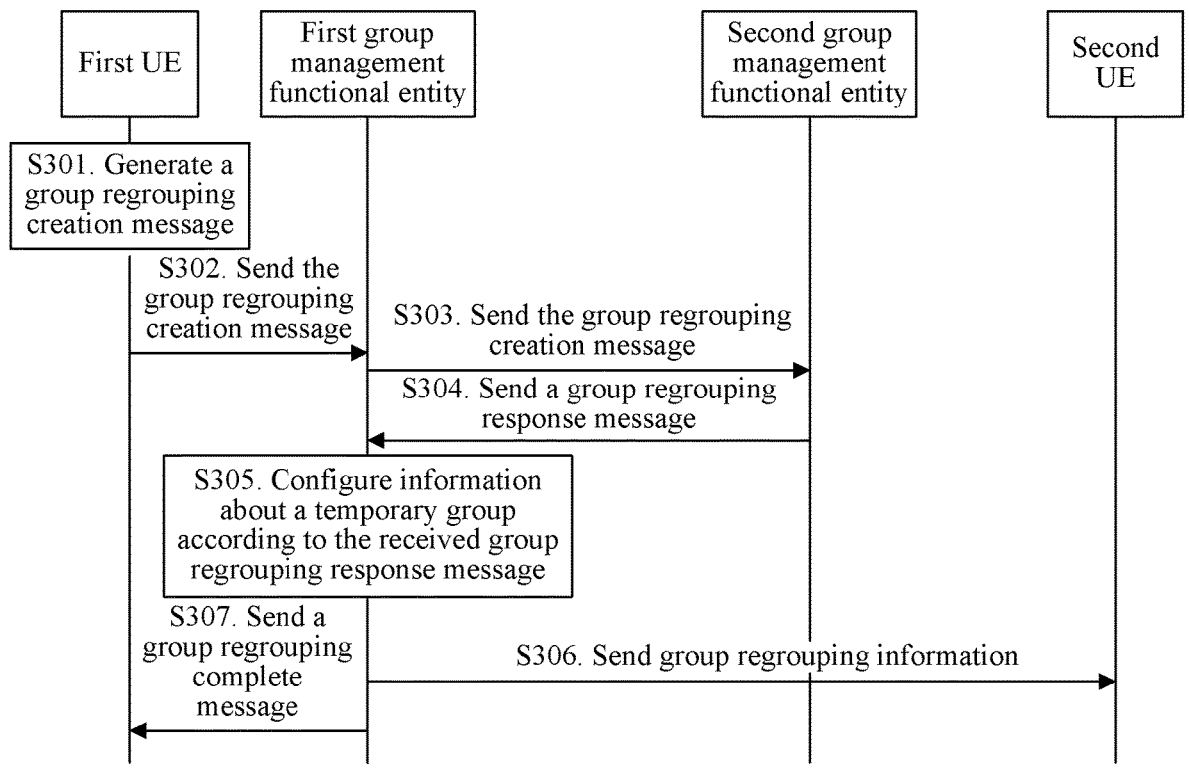
FIG. 3 is a flowchart of Embodiment 3 of a method for regrouping multiple groups according to the present application.

FIG. 3 is a flowchart of Embodiment 3 of a method for regrouping multiple groups according to the present application. As shown in FIG. 3, in this embodiment, at least one MCPTT group of N MCPTT groups is not an MCPTT group managed by a first group management functional entity, where the at least one MCPTT group of the N MCPTT groups is referred to as a first MCPTT group, that is, the first group management functional entity manages an MCPTT group that is of the N MCPTT groups and that is not the first MCPTT group. The method in this embodiment may include the following steps.

S301: First UE generates a group regrouping creation message.

The group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped. N is an integer greater than or equal to 2. The first UE is UE used by the first MCPTT user. The first MCPTT user belongs to at least one MCPTT group of the N MCPTT groups.

S302: The first UE sends the group regrouping creation message to a first group management functional entity.

Each MCPTT group includes at least one MCPTT user. The first group management functional entity is a group management functional entity in a home network of the first MCPTT user.

In this embodiment, for a specific implementation process of S301 and S302, refer to the related description in Embodiment 2 of the method in the present application. Details are not described herein again.

The first MCPTT group is not an MCPTT group managed by the first group function management entity, and there is at least one group management functional entity that manages each MCPTT group of the first MCPTT group. Herein, any group management functional entity that manages the at least one MCPTT group of the first MCPTT group is used as an example, to perform S303 and S304. The any group management functional entity is referred to a second group management functional entity. Operations corresponding to another group management functional entity are similar. Details are not described herein again.

S303: The first group management functional entity sends a group regrouping creation message to a second group management functional entity.

S304: The second group management functional entity sends a group regrouping response message to the first group management functional entity.

In this embodiment, after the second group management functional entity receives the group regrouping creation message sent by the first group management functional entity, the second group management functional entity sends the group regrouping response message to the first group management functional entity, so that the first group management functional entity can receive the group regrouping response message sent by the second group management functional entity. The group regrouping response message may be used to indicate that the regrouping of the N MCPTT groups is completed.

Optionally, before sending the group regrouping response message to the first group management functional entity, the second group management functional entity may further determine to agree to regroup the N MCPTT groups, and this may specifically be: the group management functional entity asks for permission of an owner or an administrator or an MCPTT user of at least one MCPTT group that is of the first MCPTT group and that is managed by the group management functional entity.

S305: The first group management functional entity configures information about a temporary group according to the received group regrouping response message.

In this embodiment, although the foregoing only describes that the second group management functional entity sends the group regrouping response message to the first group management functional entity, another group management functional entity also sends a group regrouping response message to the first group management functional entity. Therefore, the first group management functional entity may receive a group regrouping response message sent by at least one group management functional entity, and then the first group management functional entity may configure the information about the temporary group.

Optionally, before performing S305, the first group management functional entity may further determine to agree on regrouping of the N MCPTT groups. An optional implementation may be: the first group management functional entity asks for permission of an owner or an administrator or an MCPTT user of an MCPTT group that is of the N MCPTT groups and that is not the first MCPTT group, where the MCPTT group that is of the N MCPTT groups and that is not the first MCPTT group is an MCPTT group managed by the first group management functional entity.

Optionally, the information about the temporary group, configured by the first group management functional entity, further includes at least one of the following: a priority of the temporary group, and a security level of the temporary group.

Optionally, the information about the temporary group, configured by the first group management functional entity, further includes: information about an MCPTT user in an MCPTT group that is of the N MCPTT groups and that is not the first MCPTT group.

Optionally, the group regrouping response message further includes information about an MCPTT user in at least one MCPTT group that is of the first MCPTT group and that is managed by the second group management functional entity; correspondingly, when configuring the information about the temporary group, the first group management functional entity may also add the information included in the group regrouping response message to the information about the temporary group, so that the information about the temporary group further includes the information about the MCPTT user in the at least one MCPTT group that is of the first MCPTT group and that is managed by the second group management functional entity.

For example, when there are two group management functional entities that manage the first MCPTT group, if both the two group management functional entities disallow the first group management functional entity to share information about an MCPTT user in an MCPTT group managed by either of the two group management functional entities, group regrouping response messages sent by the two group management functional entities do not include the information about an MCPTT user in an MCPTT group managed by either of the two group management functional entities. If both the two group management functional entities allow the first group management functional entity to share information about an MCPTT user in an MCPTT group managed by either of the two group management functional entities, group regrouping response messages sent by the two group management functional entities include the information about an MCPTT user in an MCPTT group managed by either of the two group management functional entities. If one of the two group management functional entities allows the first group management functional entity to share information about an MCPTT user in an MCPTT group managed by the one group management functional entity, while the other group management functional entity disallows the first group management functional entity to share information about an MCPTT user in an MCPTT group managed by the other group management functional entity, a group regrouping response message sent by the one group management functional entity includes the information about an MCPTT user in an MCPTT group managed by the one group management functional entity, while a group regrouping response message sent by the other group management functional entity does not include the information about an MCPTT user in an MCPTT group managed by the other group management functional entity.

In this embodiment, after configuring the information about the temporary group, the first group management functional entity may send group regrouping information to UE used by any MCPTT user in the N MCPTT groups. Herein, the any MCPTT user is referred to as a second MCPTT user, and UE used by the second MCPTT user is referred to as second UE. The second MCPTT user is used as an example for description, and the procedure for another MCPTT user is similar. Details are not described herein again.

S306: The first group management functional entity sends group regrouping information to second UE.

In this embodiment, after configuring the information about the temporary group, the first group management functional entity determines, according to the information about the temporary group, group regrouping information to be sent, and then sends the group regrouping information to the second UE. The group regrouping information includes an identifier of the temporary group.

Optionally, the group management information further includes the identifiers of the N MCPTT groups.

Optionally, the group regrouping information further includes information about an MCPTT user in the at least one MCPTT group of the N MCPTT groups, that is, the group regrouping information further includes the information about an MCPTT user in the at least one MCPTT group, in the information about the temporary group.

Optionally, the group regrouping information further includes a priority of the temporary group.

Optionally, the group regrouping information further includes a security level of the temporary group.

Optionally, the group regrouping information is the information about the temporary group.

In an optional implementation, if the first group management functional entity may obtain information about the second MCPTT user, the first group management functional entity sends the group regrouping information to the second UE according to the information about the second MCPTT user and the information about the temporary group. For example, when the first group management functional entity manages an MCPTT group to which the second MCPTT user in the N MCPTT groups belongs, the first group management functional entity may obtain the information about the second MCPTT user; or, when the first group management functional entity does not manage an MCPTT group to which the second MCPTT user in the N MCPTT groups belongs, the first group management functional entity may obtain the information about the second MCPTT user from the group management functional entity that manages the MCPTT group to which the second MCPTT user belongs.

In a second optional implementation, when an MCPTT group to which the second MCPTT user in the N MCPTT groups belongs is not an MCPTT group managed by the first group management functional entity, the first group management functional entity may send the group regrouping information to the second UE by using a group management functional entity of the MCPTT group to which the second MCPTT user belongs. Specifically, the first group management functional entity sends the group regrouping information to the group management functional entity of the MCPTT group to which the second MCPTT user belongs, where the group regrouping information includes the identifier of the temporary group. After receiving the group regrouping information, the group management functional entity of the MCPTT group to which the second MCPTT user belongs may send the group regrouping information to the second UE used by the second MCPTT user. The group management functional entity of the MCPTT group to which the second MCPTT user belongs may manage at least one MCPTT group of the N MCPTT groups, where the at least one MCPTT group may include at least one MCPTT user. Therefore, the group management functional entity of the MCPTT group to which the second MCPTT user belongs may further send the group regrouping information to UE used by an MCPTT user other than the second MCPTT user. Optionally, after receiving the group regrouping information, the group management functional entity of the MCPTT group to which the second MCPTT user belongs may store the group regrouping information.

S307: The first group management functional entity sends a group regrouping complete message to the first UE.

In this embodiment, for a specific implementation process of S307, refer to the related description in the foregoing method embodiments in the present application. Details are not described herein again.

According to the method for regrouping multiple groups that is provided in this embodiment, first UE sends a group regrouping creation message to a first group management functional entity. The first group management functional entity sends the group regrouping creation message to group management functional entities of other MCPTT groups of the N MCPTT groups, and then receives group regrouping response messages sent by these group management functional entities. The first group management functional entity configures information about a temporary group according to the received group regrouping response messages, and sends, according to the information about the temporary group, group regrouping information to UE used by any MCPTT user in the N MCPTT groups, so as to regroup the N MCPTT groups. Therefore, an MCPTT user in the N MCPTT groups belongs to the temporary group into which the N MCPTT groups are regrouped, so that UEs used by MCPTT users that belong to the same temporary group into which the N MCPTT groups are regrouped can communicate with each other.

Figure 4:
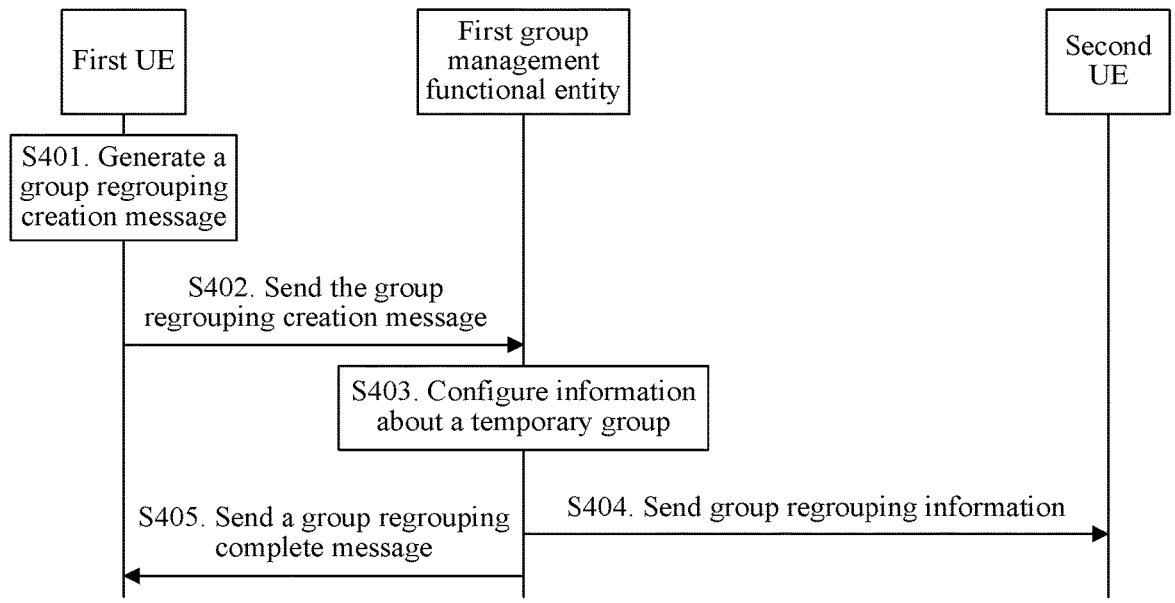
FIG. 4 is a flowchart of Embodiment 4 of a method for regrouping multiple groups according to the present application.

FIG. 4 is a flowchart of Embodiment 4 of a method for regrouping multiple groups according to the present application. As shown in FIG. 4, in this embodiment, N MCPTT groups are MCPTT groups managed by a first group management functional entity, that is, the first group management functional entity manages the N MCPTT groups. The method in this embodiment may include the following steps.

S401: First UE generates a group regrouping creation message.

The group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped. N is an integer greater than or equal to 2. The first UE is UE used by the first MCPTT user. The first group management functional entity is a group management functional entity in a home network of the first MCPTT user.

S402: The first UE sends the group regrouping creation message to a first group management functional entity.

Each MCPTT group includes at least one MCPTT user.

In this embodiment, for a specific implementation process of S401 and S402, refer to the related description in Embodiment 3 of the method in the present application. Details are not described herein again.

S403: The first group management functional entity configures information about a temporary group.

In this embodiment, the first group management functional entity is a group management functional entity that manages the N MCPTT groups. Therefore, the first group management functional entity may obtain information about an MCPTT user in the N MCPTT groups, and may configure an identifier of the temporary group into which the N MCPTT groups are regrouped, and then generate the information about the temporary group. The information about the temporary group includes: the identifier of the temporary group into which the N MCPTT groups are regrouped, the identifiers of the N MCPTT groups, and the information about the MCPTT user in the N MCPTT groups.

Optionally, the information about the temporary group further includes at least one of the following: a priority of the temporary group, and a security level of the temporary group.

S404: The first group management functional entity sends group regrouping information to second UE.

In this embodiment, the first group management functional entity may determine, according to the information about the temporary group, the group regrouping information that needs to be sent. A second MCPTT user is any MCPTT user in the N MCPTT groups, and UE used by the second MCPTT user is referred to as the second UE. The first group management functional entity manages the N MCPTT groups, and therefore, the first group management functional entity may obtain information about the second MCPTT user, and then send, according to the information about the second MCPTT user, the group regrouping information to the second UE. The first group management functional entity may further send the group regrouping information to UE used by an MCPTT user that is in the first MCPTT group and that is not the second MCPTT user. It should be noted that, the second MCPTT user may also be the first MCPTT user, and the second UE may also be the first UE.

Optionally, the group management information further includes the identifiers of the N MCPTT groups.

Optionally, the group regrouping information further includes information about an MCPTT user in the at least one MCPTT group of the N MCPTT groups, that is, the group regrouping information further includes the information about an MCPTT user in the at least one MCPTT group, in the information about the temporary group.

Optionally, the group regrouping information further includes a priority of the temporary group.

Optionally, the group regrouping information further includes a security level of the temporary group.

Optionally, the group regrouping information is the information about the temporary group.

S405: The first group management functional entity sends a group regrouping complete message to the first UE.

In this embodiment, for a specific implementation process of S405, refer to the related description in the foregoing method embodiments in the present application. Details are not described herein again.

According to the method for regrouping multiple groups that is provided in this embodiment, first UE sends a group regrouping creation message to a first group management functional entity. The first group management functional entity configures information about a temporary group, and then sends, according to the information about the temporary group, group regrouping information to UE used by any MCPTT user in N MCPTT groups, so as to regroup the N MCPTT groups. Therefore, an MCPTT user in the N MCPTT groups belongs to the temporary group into which the N MCPTT groups are regrouped, so that UEs used by MCPTT users that belong to the same temporary group into which the N MCPTT groups are regrouped can communicate with each other.

Figure 5:
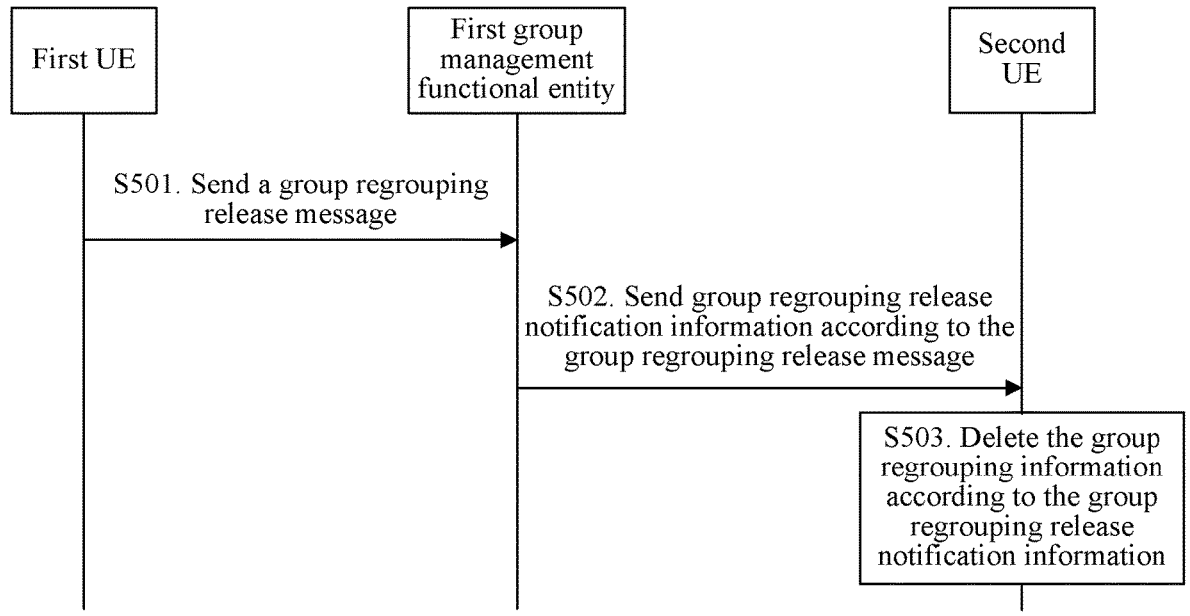
FIG. 5 is a flowchart of Embodiment 5 of a method for regrouping multiple groups according to the present application.

FIG. 5 is a flowchart of Embodiment 5 of a method for regrouping multiple groups according to the present application. As shown in FIG. 5, based on the embodiment shown in FIG. 3, the method in this embodiment may further include the following steps.

S501: The first UE sends a group regrouping release message to the first group management functional entity.

In this embodiment, when the first UE determines that the first MCPTT user using the first UE initiates release of the temporary group into which the N MCPTT groups are regrouped, the first UE may send the group regrouping release message to the first group management functional entity. The group regrouping release message includes the identifier of the temporary group; and the group regrouping release message is used to request the first group management functional entity to release, according to the identifier of the temporary group, the temporary group into which the N MCPTT groups are regrouped.

S502: The first group management functional entity sends group regrouping release notification information to the second UE according to the group regrouping release message.

In this embodiment, after receiving the group regrouping release message sent by the first UE, the first group management functional entity sends the group regrouping release notification information to the second UE. The group regrouping release notification information includes the identifier of the temporary group, and the group regrouping release notification information is used to instruct the second UE to delete, according to the identifier of the temporary group, the received group regrouping information.

In an optional implementation, if the first group management functional entity may obtain information about the second MCPTT user, the first group management functional entity sends the group regrouping release notification information to the second UE according to the information about the second MCPTT user and the group regrouping release message. For example, when the first group management functional entity manages an MCPTT group to which the second MCPTT user in the N MCPTT groups belongs, the first group management functional entity may obtain the information about the second MCPTT user; or, when the first group management functional entity does not manage an MCPTT group to which the second MCPTT user in the N MCPTT groups belongs, the first group management functional entity may obtain the information about the second MCPTT user from the group management functional entity that manages the MCPTT group to which the second MCPTT user belongs.

In a second optional implementation, when an MCPTT group to which the second MCPTT user in the N MCPTT groups belongs is not an MCPTT group managed by the first group management functional entity, the first group management functional entity may send the group regrouping release notification information to the second UE by using a group management functional entity of the MCPTT group to which the second MCPTT user belongs. Specifically, the first group management functional entity sends the group regrouping release notification information to the group management functional entity of the MCPTT group to which the second MCPTT user belongs, where the group regrouping release notification information includes the identifier of the temporary group. After receiving the group regrouping release notification information, the group management functional entity of the MCPTT group to which the second MCPTT user belongs may send the group regrouping release notification information to the second UE used by the second MCPTT user. The group management functional entity of the MCPTT group to which the second MCPTT user belongs may manage at least one MCPTT group of the N MCPTT groups, where the at least one MCPTT group may include at least one MCPTT user. Therefore, the group management functional entity of the MCPTT group to which the second MCPTT user belongs may further send the group regrouping release notification information to UE used by an MCPTT user other than the second MCPTT user.

S503: The second UE deletes the group regrouping information according to the group regrouping release notification information.

After receiving the group regrouping release notification information sent by the group management functional entity of the MCPTT group to which the second MCPTT user belongs, the second UE deletes the group regrouping information according to the received group regrouping release notification information. As a result, the temporary group into which the N MCPTT groups are regrouped is released.

Optionally, the second UE may further send group regrouping release response information to the group management functional entity of the MCPTT group to which the second MCPTT user belongs, where the group regrouping release response information is used to indicate that the group regrouping information has been deleted. Alternatively, the group management functional entity of the MCPTT group to which the second MCPTT user belongs may send the group regrouping release response information to the first group management functional entity.

Optionally, after receiving the group regrouping release notification information, the group management functional entity of the MCPTT group to which the second MCPTT user belongs deletes, according to the group regrouping release notification information, the group regrouping information stored by the group management functional entity.

Optionally, the first group management functional entity may further send a group regrouping release complete message to the first UE. The group regrouping release complete message is used to indicate that the temporary group into which the N MCPTT groups are regrouped has been released.

Optionally, after receiving the group regrouping release message sent by the first UE, the first group management functional entity may delete, according to the group regrouping release message, the information about the temporary group stored by the first group management functional entity.

According to the method for regrouping multiple groups that is provided in this embodiment, first UE sends a group regrouping release message to a first group management functional entity. The first group management functional entity instructs, according to the group regrouping release message, UE of an MCPTT user in N MCPTT groups to delete group regrouping information, so as to release a temporary group into which the N MCPTT groups are regrouped.

Figure 6:
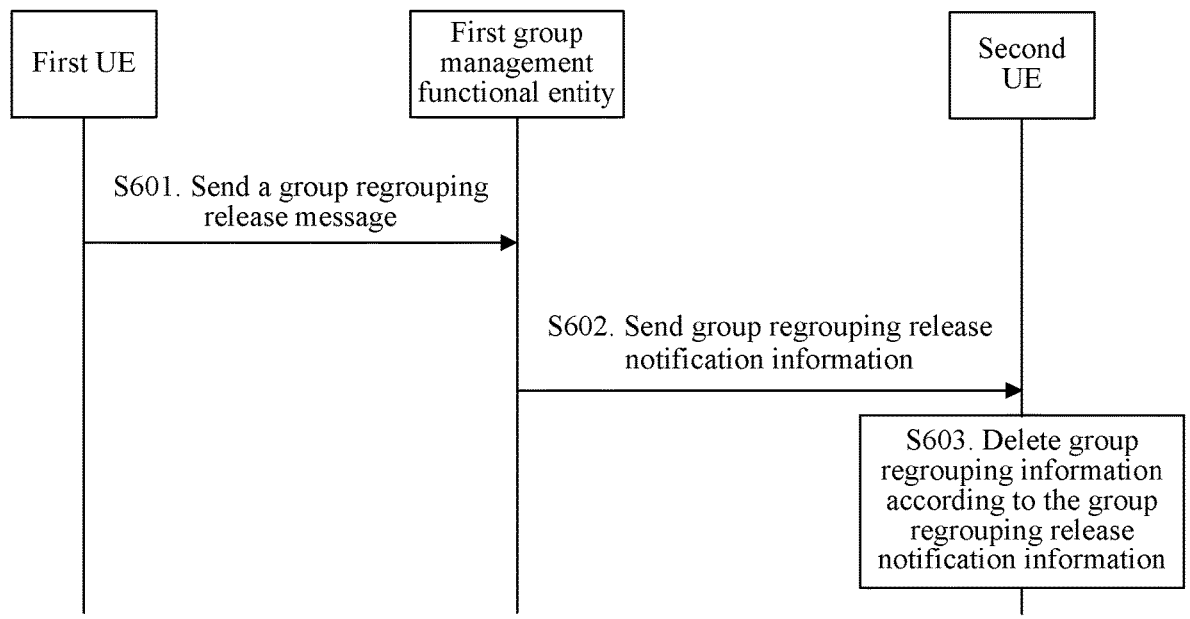
FIG. 6 is a flowchart of Embodiment 6 of a method for regrouping multiple groups according to the present application.

FIG. 6 is a flowchart of Embodiment 6 of a method for regrouping multiple groups according to the present application. As shown in FIG. 6, based on the embodiment shown in FIG. 4, the method in this embodiment may further include the following steps.

S601: The first UE sends a group regrouping release message to the first group management functional entity.

In this embodiment, for a specific implementation process of S601, refer to the related description in Embodiment 5 of the method in the present application. Details are not described herein again.

S602: The first group management functional entity sends group regrouping release notification information to the second UE.

In this embodiment, the second MCPTT user is any MCPTT user of the N MCPTT groups. For the second MCPTT user, refer to the related description in Embodiment 4 of the method in the present application. Details are not described herein again. The first MCPTT group may obtain the information about the MCPTT user in the N MCPTT groups, and therefore, the first group management functional entity may send the group regrouping release notification information to the second UE according to the information about the second MCPTT user. The group regrouping release notification information includes the identifier of the temporary group. The group regrouping release notification information is used to instruct the second UE to delete the group regrouping information according to the identifier of the temporary group. The first group management functional entity may further send the group regrouping release notification information to UE used by an MCPTT user in the first MCPTT group other than the second MCPTT user.

S603: The second UE deletes the group regrouping information according to the group regrouping release notification information.

In this embodiment, after receiving the group regrouping release notification information sent by the first group management functional entity, the second UE deletes the group regrouping information according to the received group regrouping release notification information. Optionally, the second UE may further send group regrouping release response information to the first group management functional entity. The group regrouping release response information is used to indicate that the group regrouping information has been deleted.

Optionally, the first group management functional entity may further send a group regrouping release complete message to the first UE. The group regrouping release complete message is used to indicate that the temporary group into which the N MCPTT groups are regrouped has been released.

Optionally, after receiving the group regrouping release message sent by the first UE, the first group management functional entity may delete, according to the group regrouping release message, the information about the temporary group stored by the first group management functional entity.

According to the method for regrouping multiple groups that is provided in this embodiment, first UE sends a group regrouping release message to a first group management functional entity. The first group management functional entity instructs, according to the group regrouping release message, UE used by an MCPTT user in N MCPTT groups to delete group regrouping information, so as to release a temporary group into which the N MCPTT groups are regrouped.

Figure 7:
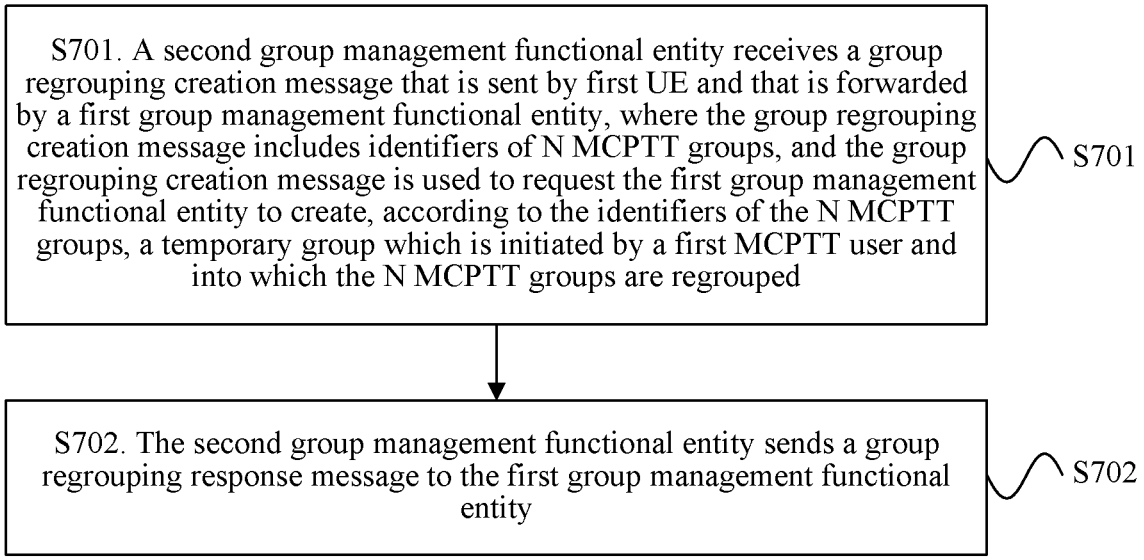
FIG. 7 is a flowchart of Embodiment 7 of a method for regrouping multiple groups according to the present application.

FIG. 7 is a flowchart of Embodiment 7 of a method for regrouping multiple groups according to the present application. As shown in FIG. 7, the method in this embodiment may include the following steps.

S701: A second group management functional entity receives a group regrouping creation message that is sent by first UE and that is forwarded by a first group management functional entity, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped.

N is an integer greater than or equal to 2. Each MCPTT group includes at least one MCPTT user. The first group management functional entity is a group management functional entity in a home network of the first MCPTT user. The second group management functional entity manages at least one MCPTT group of the N MCPTT groups. The first MCPTT user belongs to at least one MCPTT group of the N MCPTT groups.

S702: The second group management functional entity sends a group regrouping response message to the first group management functional entity.

Optionally, the group regrouping response message further includes information about an MCPTT user in the at least one MCPTT group that is of the N MCPTT groups and that is managed by the second group management functional entity.

In this embodiment, for a specific implementation process of S701 and S702, refer to the description related to the second group management functional entity in Embodiment 3 of the method in the present application. Details are not described herein again.

According to the method for regrouping multiple groups that is provided in this embodiment, the regrouping of the N MCPTT groups is completed. Therefore, a user in the N MCPTT groups belongs to the temporary group into which the N MCPTT groups are regrouped, so that UEs used by MCPTT users that belong to the same temporary group into which the N MCPTT groups are regrouped can communicate with each other.

Optionally, the second group management functional entity further receives group regrouping information sent by the first group management functional entity. The group regrouping information includes an identifier of the temporary group into which the N MCPTT groups are regrouped. Then, the second group management functional entity sends the group regrouping information to second UE, where the second UE is UE used by a second MCPTT user, and the second MCPTT user is any MCPTT user in the at least one MCPTT group that is of the N MCPTT groups and that is managed by the second group management functional entity. For a specific implementation process, refer to the description related to the group management functional entity of the MCPTT group to which the second MCPTT user belongs in Embodiment 3 of the method in the present application. Details are not described herein again.

Optionally, after S702 is performed, the method further includes: receiving, by the second group management functional entity, group regrouping release notification information sent by the first group management functional entity, where the group regrouping release notification information includes the identifier of the temporary group; and sending the group regrouping release notification information to the second UE. Optionally, after receiving the group regrouping release notification information sent by the first group management functional entity, the second group management functional entity may delete, according to the group regrouping release notification information, the group regrouping information stored by the second group management functional entity. For a specific implementation process, refer to the related description in the Embodiment 5 of the method in the present application. Details are not described herein again. In this way, the temporary group into which the N MCPTT groups are regrouped is released.

It should be noted that, the group management functional entity of the MCPTT group to which the second MCPTT user belongs indicates that the group management functional entity manages the MCPTT group to which the second MCPTT user belongs.

Figure 8:
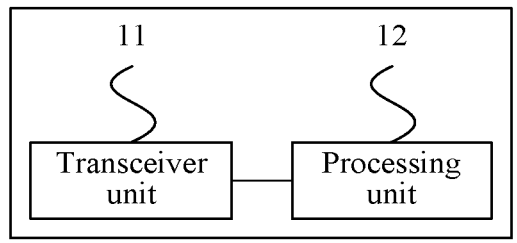
FIG. 8 is a schematic structural diagram of Embodiment 1 of a group management functional entity according to the present application.

FIG. 8 is a schematic structural diagram of Embodiment 1 of a group management functional entity according to the present application. As shown in FIG. 8, the group management functional entity in this embodiment is used as a first group management functional entity, and may include: a transceiver unit 11 and a processing unit 12. The transceiver unit 11 is configured to receive a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped; the first group management functional entity is a group management functional entity in a home network of the first MCPTT user; and the first MCPTT user belongs to at least one MCPTT group of the N MCPTT groups. The processing unit 12 is configured to configure information about the temporary group, where the information about the temporary group includes: an identifier of the temporary group into which the N MCPTT groups are regrouped, and the identifiers of the N MCPTT groups.

Optionally, the transceiver unit 11 is further configured to: after the processing unit 12 configures the information about the temporary group, send a group regrouping complete message to the first UE.

Optionally, the information about the temporary group further includes at least one of the following: information about an MCPTT user in at least one MCPTT group of the N MCPTT groups, a priority of the temporary group, or a security level of the temporary group.

In an optional implementation, the N MCPTT groups are MCPTT groups managed by the first group management functional entity.

In another optional implementation, a first MCPTT group of the N MCPTT groups is not an MCPTT group managed by the first group management functional entity, and the first MCPTT group is at least one MCPTT group of the N MCPTT groups;

the transceiver unit 11 is further configured to: before the processing unit 12 configures the information about the temporary group, send the group regrouping creation message to a second group management functional entity, where the second group management functional entity is any group management functional entity that manages at least one MCPTT group of the first MCPTT group; and receive a group regrouping response message sent by the second group management functional entity; and when configuring the information about the temporary group, the processing unit 12 is specifically configured to configure the information about the temporary group according to the group regrouping response message.

Optionally, the group regrouping response message further includes information about an MCPTT user in the at least one MCPTT group that is of the first MCPTT group and that is managed by the second group management functional entity.

Optionally, the transceiver unit 11 is further configured to: after the processing unit 12 configures the information about the temporary group, send group regrouping information to second UE, where the group regrouping information includes the identifier of the temporary group, the second UE is UE used by a second MCPTT user, and the second MCPTT user is any MCPTT user in the N MCPTT groups.

Optionally, when an MCPTT group to which the second MCPTT user belongs is not an MCPTT group managed by the first group management functional entity, when sending the group regrouping information to the second UE, the transceiver unit 11 is specifically configured to: send the group regrouping information to a group management functional entity of the MCPTT group to which the second MCPTT user belongs, so that the group management functional entity of the MCPTT group to which the second MCPTT user belongs sends the group regrouping information to the second UE.

Optionally, the transceiver unit 11 is further configured to receive a group regrouping release message sent by the first UE, where the group regrouping release message includes the identifier of the temporary group, and the group regrouping release message is used to request the first group management functional entity to release the temporary group according to the identifier of the temporary group; and send group regrouping release notification information to the second UE according to the group regrouping release message, where the group regrouping release notification information includes the identifier of the temporary group; and the group regrouping release notification information is used to instruct the second UE to delete the group regrouping information according to the identifier of the temporary group.

Optionally, when an MCPTT group to which the second MCPTT user belongs is not an MCPTT group managed by the first group management functional entity, when sending the group regrouping release notification information to the second UE according to the group regrouping release message, the transceiver unit 11 is specifically configured to send, according to the group regrouping release message, the group regrouping release notification information to a group management functional entity of the MCPTT group to which the second MCPTT user belongs, so that the group management functional entity of the MCPTT group to which the second MCPTT user belongs sends the group regrouping release notification information to the second UE.

Optionally, the processing unit 12 is further configured to: after the transceiver unit 11 receives the group regrouping release message sent by the first UE, delete the information about the temporary group.

The group management functional entity in this embodiment may be configured to execute the technical solutions executed by the first group management functional entity in the foregoing method embodiments of the present application. The implementation principle and technical effects thereof are similar to those of the method embodiments. Details are not described herein again.

Figure 9:
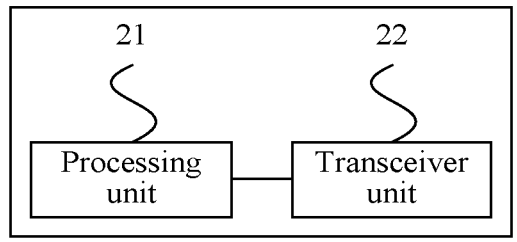
FIG. 9 is a schematic structural diagram of Embodiment 1 of UE according to the present application.

FIG. 9 is a schematic structural diagram of Embodiment 1 of UE according to the present application. As shown in FIG. 9, the UE in this embodiment is used as first UE, and may include: a processing unit 21 and a transceiver unit 22. The processing unit 21 is configured to generate a group regrouping creation message, where the group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped, where N is an integer greater than or equal to 2; the first MCPTT user belongs to at least one MCPTT group of the N MCPTT groups; and the first group management functional entity is a group function management entity in a home network of the first MCPTT user. The transceiver unit 22 is configured to send the group regrouping creation message to the first group management functional entity.

Optionally, the transceiver unit 22 is further configured to: after sending the group regrouping creation message to the first group management functional entity, receive a group regrouping complete message sent by the first group management functional entity.

Optionally, the transceiver unit 22 is further configured to: after sending the group regrouping creation message to the first group management functional entity, receive group regrouping information sent by the first group management functional entity, where the group regrouping information includes an identifier of the temporary group.

Optionally, the transceiver unit 22 is further configured to: after sending the group regrouping creation message to the first group management functional entity, send a group regrouping release message to the first group management functional entity, where the group regrouping release message includes the identifier of the temporary group, and the group regrouping release message is used to request the first group management functional entity to release the temporary group according to the identifier of the temporary group; and receive group regrouping release notification information sent by the first group management functional entity, where the group regrouping release notification information includes the identifier of the temporary group; and the processing unit 21 is further configured to delete the group regrouping information according to the identifier of the temporary group in the group regrouping release notification information.

The UE in this embodiment may be configured to execute the technical solutions executed by the first UE in the foregoing method embodiments of the present application. The implementation principle and technical effects thereof are similar to those of the method embodiments. Details are not described herein again.

Figure 10:
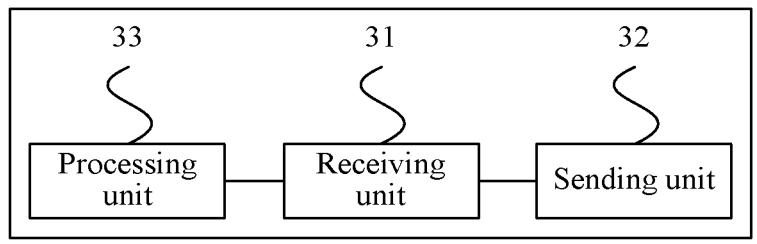
FIG. 10 is a schematic structural diagram of Embodiment 2 of a group management functional entity according to the present application.

FIG. 10 is a schematic structural diagram of Embodiment 2 of a group management functional entity according to the present application. As shown in FIG. 10, the group management functional entity in this embodiment is used as a second group management functional entity, and may include: a receiving unit 31 and a sending unit 32. The receiving unit 31 is configured to receive a group regrouping creation message that is sent by first user equipment UE and that is forwarded by a first group management functional entity, where the group regrouping creation message includes identifiers of N MCPTT groups, the group regrouping creation message is used to request the first group management functional entity to create, according to the identifiers of the N MCPTT groups, a temporary group which is initiated by a first MCPTT user and into which the N MCPTT groups are regrouped, and the second group management functional entity manages at least one MCPTT group of the N MCPTT groups; the first group management functional entity is a group management functional entity in a home network of the first MCPTT user; and the first MCPTT user belongs to at least one MCPTT group of the N MCPTT groups. The sending unit 32 is configured to send a group regrouping response message to the first group management functional entity.

Optionally, the group regrouping response message further includes information about an MCPTT user in the at least one MCPTT group that is of the N MCPTT groups and that is managed by the second group management functional entity.

Optionally, the receiving unit 31 is further configured to: after the sending unit 32 sends the group regrouping response message to the first group management functional entity, receive group regrouping information sent by the first group management functional entity, where the group regrouping information includes an identifier of the temporary group; and the sending unit 32 is further configured to send the group regrouping information to second UE, where the second UE is UE used by a second MCPTT user, and the second MCPTT user is any MCPTT user in the at least one MCPTT group that is of the N MCPTT groups and that is managed by the second group management functional entity.

Optionally, the receiving unit 31 is further configured to receive group regrouping release notification information sent by the first group management functional entity, where the group regrouping release notification information includes the identifier of the temporary group; and the group regrouping release notification information is used to instruct to delete the group regrouping information according to the identifier of the temporary group; and the sending unit 32 is further configured to send the group regrouping release notification information to the second UE.

Optionally, the group management functional entity in this embodiment may further include: a processing unit 33. The processing unit 33 is configured to: after the receiving unit 31 receives the group regrouping release notification information sent by the first group management functional entity, delete the group regrouping information.

The group management functional entity in this embodiment may be configured to execute the technical solutions executed by the second group management functional entity in the foregoing method embodiments of the present application. The implementation principle and technical effects thereof are similar to those of the method embodiments. Details are not described herein again.

Figure 11:
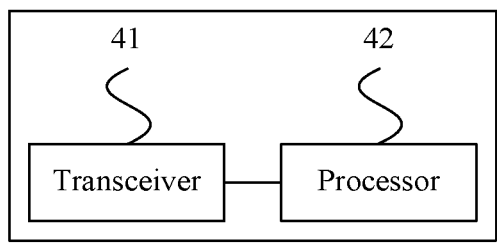
FIG. 11 is a schematic structural diagram of Embodiment 3 of a group management functional entity according to the present application.

FIG. 11 is a schematic structural diagram of Embodiment 3 of a group management functional entity according to the present application. As shown in FIG. 11, the group management functional entity in this embodiment is used as a first group management functional entity, and may include: a transceiver 41 and a processor 42. The transceiver 41 is configured to receive a group regrouping creation message sent by first UE, where the group regrouping creation message includes identifiers of N MCPTT groups, and the group regrouping creation message is used to request the first group management functional entity to create, according to the identifiers of the N MCPTT groups, a temporary group which is initiated by a first MCPTT user and into which the N MCPTT groups are regrouped; the first group management functional entity is a group management functional entity in a home network of the first MCPTT user; and the first MCPTT user belongs to at least one MCPTT group of the N MCPTT groups. The processor 42 is configured to configure information about the temporary group, where the information about the temporary group includes: an identifier of the temporary group into which the N MCPTT groups are regrouped, and the identifiers of the N MCPTT groups.

Optionally, the transceiver 41 is further configured to: after the processor 42 configures the information about the temporary group, send a group regrouping complete message to the first UE.

Optionally, the information about the temporary group further includes at least one of the following: information about an MCPTT user in at least one MCPTT group of the N MCPTT groups, a priority of the temporary group, or a security level of the temporary group.

Optionally, the N MCPTT groups are MCPTT groups managed by the first group management functional entity.

Optionally, a first MCPTT group of the N MCPTT groups is not an MCPTT group managed by the first group management functional entity, and the first MCPTT group is at least one MCPTT group of the N MCPTT groups;

the transceiver 41 is further configured to: before the processor 42 configures the information about the temporary group, send the group regrouping creation message to a second group management functional entity, where the second group management functional entity is any group management functional entity that manages at least one MCPTT group of the first MCPTT group; and receive a group regrouping response message sent by the second group management functional entity; and when configuring the information about the temporary group, the processor 42 is specifically configured to configure the information about the temporary group according to the group regrouping response message.

Optionally, the group regrouping response message further includes information about an MCPTT user in the at least one MCPTT group that is of the first MCPTT group and that is managed by the second group management functional entity.

Optionally, the transceiver 41 is further configured to: after the processor 42 configures the information about the temporary group, send group regrouping information to second UE, where the group regrouping information includes the identifier of the temporary group, the second UE is UE used by a second MCPTT user, and the second MCPTT user is any MCPTT user in the N MCPTT groups.

Optionally, when an MCPTT group to which the second MCPTT user belongs is not an MCPTT group managed by the first group management functional entity, when sending the group regrouping information to the second UE, the transceiver 41 is specifically configured to: send the group regrouping information to a group management functional entity of the MCPTT group to which the second MCPTT user belongs, so that the group management functional entity of the MCPTT group to which the second MCPTT user belongs sends the group regrouping information to the second UE.

Optionally, the transceiver 41 is further configured to: receive a group regrouping release message sent by the first UE, where the group regrouping release message includes the identifier of the temporary group, and the group regrouping release message is used to request the first group management functional entity to release the temporary group according to the identifier of the temporary group; and send group regrouping release notification information to the second UE according to the group regrouping release message, where the group regrouping release notification information includes the identifier of the temporary group; and the group regrouping release notification information is used to instruct the second UE to delete the group regrouping information according to the identifier of the temporary group.

Optionally, when an MCPTT group to which the second MCPTT user belongs is not an MCPTT group managed by the first group management functional entity, when sending the group regrouping release notification information to the second UE according to the group regrouping release message, the transceiver 41 is specifically configured to send, according to the group regrouping release message, the group regrouping release notification information to a group management functional entity of the MCPTT group to which the second MCPTT user belongs, so that the group management functional entity of the MCPTT group to which the second MCPTT user belongs sends the group regrouping release notification information to the second UE.

Optionally, the processor 42 is further configured to: after the transceiver 41 receives the group regrouping release message sent by the first UE, delete the information about the temporary group.

The group management functional entity in this embodiment may be configured to execute the technical solutions executed by the first group management functional entity in the foregoing method embodiments of the present application. The implementation principle and technical effects thereof are similar to those of the method embodiments. Details are not described herein again.

Figure 12:
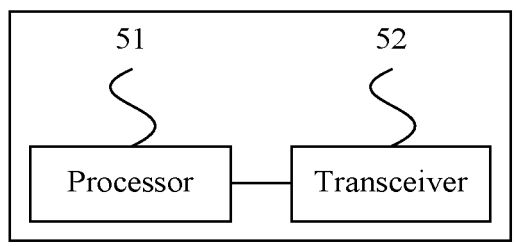
FIG. 12 is a schematic structural diagram of Embodiment 2 of UE according to the present application.

FIG. 12 is a schematic structural diagram of Embodiment 2 of UE according to the present application. As shown in FIG. 12, the UE in this embodiment is used as first UE, and may include: a processor 51 and a transceiver 52. The processor 51 is configured to generate a group regrouping creation message, where the group regrouping creation message includes identifiers of N MCPTT groups, and the group regrouping creation message is used to request a first group management functional entity to create, according to the identifiers of the N MCPTT groups, a temporary group which is initiated by a first MCPTT user and into which the N MCPTT groups are regrouped, where N is an integer greater than or equal to 2; the first MCPTT user belongs to at least one MCPTT group of the N MCPTT groups; and the first group management functional entity is a group function management entity in a home network of the first MCPTT user. The transceiver 52 is configured to send the group regrouping creation message to the first group management functional entity.

Optionally, the transceiver 52 is further configured to: after sending the group regrouping creation message to the first group management functional entity, receive a group regrouping complete message sent by the first group management functional entity.

Optionally, the transceiver 52 is further configured to: after sending the group regrouping creation message to the first group management functional entity, receive group regrouping information sent by the first group management functional entity, where the group regrouping information includes an identifier of the temporary group.

Optionally, the transceiver 52 is further configured to: after sending the group regrouping creation message to the first group management functional entity, send a group regrouping release message to the first group management functional entity, where the group regrouping release message includes the identifier of the temporary group, and the group regrouping release message is used to request the first group management functional entity to release the temporary group according to the identifier of the temporary group; and receive group regrouping release notification information sent by the first group management functional entity, where the group regrouping release notification information includes the identifier of the temporary group; and the processor 51 is further configured to delete the group regrouping information according to the identifier of the temporary group in the group regrouping release notification information.

The UE in this embodiment may be configured to execute the technical solutions executed by the first UE in the foregoing method embodiments of the present application. The implementation principle and technical effects thereof are similar to those of the method embodiments. Details are not described herein again.

Figure 13:
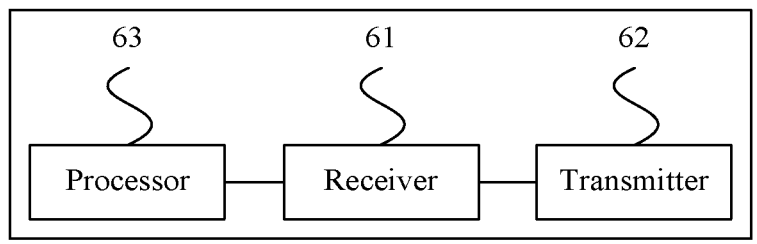
FIG. 13 is a schematic structural diagram of Embodiment 4 of a group management functional entity according to the present application.

FIG. 13 is a schematic structural diagram of Embodiment 4 of a group management functional entity according to the present application. As shown in FIG. 13, the group management functional entity in this embodiment is used as a second group management functional entity, and may include: a receiver 61 and a transmitter 62. The receiver 61 is configured to receive a group regrouping creation message that is sent by first user equipment UE and that is forwarded by a first group management functional entity, where the group regrouping creation message includes identifiers of N MCPTT groups, the group regrouping creation message is used to request the first group management functional entity to create, according to the identifiers of the N MCPTT groups, a temporary group which is initiated by a first MCPTT user and into which the N MCPTT groups are regrouped, and the second group management functional entity manages at least one MCPTT group of the N MCPTT groups; the first group management functional entity is a group management functional entity in a home network of the first MCPTT user; and the first MCPTT user belongs to at least one MCPTT group of the N MCPTT groups. The transmitter 62 is configured to send a group regrouping response message to the first group management functional entity.

Optionally, the group regrouping response message further includes information about an MCPTT user in the at least one MCPTT group that is of the N MCPTT groups and that is managed by the second group management functional entity.

Optionally, the receiver 61 is further configured to: after the transmitter 62 sends the group regrouping response message to the first group management functional entity, receive group regrouping information sent by the first group management functional entity, where the group regrouping information includes an identifier of the temporary group; and the transmitter 62 is further configured to send the group regrouping information to second UE, where the second UE is UE used by a second MCPTT user, and the second MCPTT user is any MCPTT user in the at least one MCPTT group that is of the N MCPTT groups and that is managed by the second group management functional entity.

Optionally, the receiver 61 is further configured to receive group regrouping release notification information sent by the first group management functional entity, where the group regrouping release notification information includes the identifier of the temporary group; and the group regrouping release notification information is used to instruct to delete the group regrouping information according to the identifier of the temporary group; and the transmitter 62 is further configured to send the group regrouping release notification information to the second UE.

Optionally, the group management functional entity in this embodiment may further include: a processor 63. The processor 63 is configured to: after the receiver 61 receives the group regrouping release notification information sent by the first group management functional entity, delete the group regrouping information.

The group management functional entity in this embodiment may be configured to execute the technical solutions executed by the second group management functional entity in the foregoing method embodiments of the present application. The implementation principle and technical effects thereof are similar to those of the method embodiments. Details are not described herein again.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM for short), a random access memory (RAM for short), a magnetic disk, or an optical disc.

Finally, it should be noted that the foregoing embodiments are merely intended for describing the technical solutions of the present application, but not for limiting the present application. Although the present application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A communications system comprising a first group management functional entity and a second group management functional entity, wherein
the first group management functional entity is configured to receive a group regrouping creation message from first user equipment (UE),
wherein the group regrouping creation message comprises identifiers of N mission critical push-to-talk (MCPTT) groups,
wherein the group regrouping creation message requests to create, according to the identifiers of the N MCPTT groups, a temporary group that is initiated by a first MCPTT user,
wherein the N MCPTT groups are regrouped into the temporary group, N is an integer greater than or equal to 2, and
wherein the first group management functional entity is located in a home network of the first MCPTT user;
the first group management functional entity is further configured to send the group regrouping creation message to the second group management functional entity,
wherein the second group management functional entity manages a first MCPTT group of the N MCPTT groups;
the second group management functional entity is configured to send a group regrouping response message to the first group management functional entity; and
the first group management functional entity is further configured to configure information about the temporary group according to the group regrouping response message.

2. The system according to claim 1, wherein the first MCPTT group comprises at least one MCPTT group of the N MCPTT groups.

3. The system according to claim 1, wherein the group regrouping response message comprises information about an MCPTT user in the at least one MCPTT group that is of the N MCPTT groups and that is managed by the second group management functional entity.

4. The system according to claim 1, wherein the information about the temporary group comprises an identifier of the temporary group into which the N MCPTT groups are regrouped, and the identifiers of the N MCPTT groups.

5. The system according to claim 4, wherein the information about the temporary group further comprises at least one of the following (a) and (b):
(a) a priority of the temporary group, and
(b) a security level of the temporary group.

6. The system according to claim 1, wherein the first group management functional entity is further configured to send group regrouping information to second UE,
wherein the group regrouping information comprises an identifier of the temporary group, the second UE is used by a second MCPTT user, and the second MCPTT user is any MCPTT user in the N MCPTT groups.

7. The system according to claim 1, wherein the system further comprises a third group management functional entity that is of a second MCPTT group, wherein the second MCPTT group is in the N MCPTT groups and is an MCPTT group to which a third MCPTT user belongs,
the first group management functional entity is further configured to send group regrouping information to the third group management functional entity, wherein the group regrouping information comprises an identifier of the temporary group; and
the third group management functional entity is configured to send the group regrouping information to third UE, wherein the third UE is used by the third MCPTT user.

8. The system according to claim 7, wherein the group regrouping information further comprises at least one of the following (a), (b) and (c):
(a) the identifiers of the N MCPTT groups,
(b) a priority of the temporary group, and
(c) a security level of the temporary group.

9. The system according to claim 1, wherein the first MCPTT user belongs to at least one MCPTT group of the N MCPTT groups.

10. A non-transitory computer-readable medium comprising computer program code stored thereon, which is executable by one or more digital processors for providing system configurations, the computer program code including:
instructions for generating a group regrouping creation message,
wherein the group regrouping creation message comprises identifiers of N mission critical push-to-talk (MCPTT) groups, and
wherein the group regrouping creation message requests a group management functional entity to create, according to the identifiers of the N MCPTT groups, a temporary group that is initiated by a first MCPTT user and into which the N MCPTT groups are regrouped,
wherein N is an integer greater than or equal to 2, and wherein the group management functional entity is located in a home network of the first MCPTT user; and instructions for sending the group regrouping creation message to the group management functional entity.

11. The non-transitory computer-readable medium according to claim 10, wherein the first MCPTT user belongs to at least one MCPTT group of the N MCPTT groups.

12. The non-transitory computer-readable medium according to claim 10, wherein the computer program code further includes instructions for receiving group regrouping information from the group management functional entity after sending the group regrouping creation message to the group management functional entity, wherein the group regrouping information comprises an identifier of the temporary group.

13. The non-transitory computer-readable medium according to claim 10, wherein the computer program code further includes instructions for sending a group regrouping release message to the group management functional entity after sending the group regrouping creation message to the group management functional entity, wherein the group regrouping release message comprises the identifier of the temporary group, and wherein the group regrouping release message requests the group management functional entity to release the temporary group according to the identifier of the temporary group;

instructions for receiving group regrouping release notification information from the group management functional entity, wherein the group regrouping release notification information comprises the identifier of the temporary group; and instructions for deleting the group regrouping information according to the identifier of the temporary group in the group regrouping release notification information.

14. A non-transitory computer-readable medium comprising computer program code stored thereon, that is executable by one or more processors for providing system configurations, the computer program code including:

instructions for receiving a group regrouping creation message from first user equipment (UE), wherein the group regrouping creation message comprises identifiers of N mission critical push to talk (MCPTT) groups, wherein N is an integer greater than or equal to 2, wherein the group regrouping creation message requests a first group management functional entity to create, according to the identifiers of the N MCPTT groups, a temporary group which is initiated by a first MCPTT user and into which the N MCPTT groups are regrouped, and wherein the first group management functional entity is in a home network of the first MCPTT user; and instructions for configuring information about the temporary group, wherein the configured information about the temporary group comprises: an identifier of the temporary group into which the N MCPTT groups are regrouped, and the identifiers of the N MCPTT groups.

15. The non-transitory computer-readable medium according to claim 14, wherein the computer program code further comprises:

instructions for sending the group regrouping creation message to a second group management functional entity, wherein the second group management functional entity manages a first MCPTT group of the N MCPTT groups; and instructions for receiving a group regrouping response message from the second group management functional entity.

16. A communications method comprising:

receiving, by a first group management functional entity, a group regrouping creation message from first user equipment (UE), wherein the group regrouping creation message comprises identifiers of N mission critical push-to-talk (MCPTT) groups, wherein the group regrouping creation message requests to create, according to the identifiers of the N MCPTT groups, a temporary group that is initiated by a first MCPTT user, wherein the N MCPTT groups are regrouped into the temporary group, N is an integer greater than or equal to 2, and wherein the first group management functional entity is located in a home network of the first MCPTT user;

sending, by the first group management functional entity, the group regrouping creation message to a second group management functional entity, wherein the second group management functional entity manages a first MCPTT group of the N MCPTT groups;

sending, by the second group management functional entity, a group regrouping response message to the first group management functional entity; and configuring, by the first group management functional entity, information about the temporary group according to the group regrouping response message.

17. The communications method according to claim 16, wherein the information about the temporary group comprises an identifier of the temporary group, and the identifiers of the N MCPTT groups.

18. The communications method according to claim 17, wherein the information about the temporary group further comprises at least one of the following (a) and (b):

(a) a priority of the temporary group, and (b) a security level of the temporary group.

19. The communications method according to claim 16, further comprises:

sending, by the first group management functional entity, group regrouping information to a third group management functional entity that is of a second MCPTT group in the N MCPTT groups, wherein the group regrouping information comprises an identifier of the temporary group.

20. The communications method according to claim 19, wherein the group regrouping information further comprises at least one of the following (a), (b) and (c):

(a) the identifiers of the N MCPTT groups, (b) a priority of the temporary group, and (c) a security level of the temporary group.

* * * * *